US010992901B2

(12) United States Patent
Wang et al.

(10) Patent No.: US 10,992,901 B2
(45) Date of Patent: Apr. 27, 2021

(54) METHOD, APPARATUS, DEVICE AND STORAGE MEDIUM FOR CONTROLLING VIDEO PLAYBACK SPEED

(71) Applicant: BEIJING MICROLIVE VISION TECHNOLOGY CO., LTD, Beijing (CN)

(72) Inventors: Yanzhi Wang, Beijing (CN); Hao Cui, Beijing (CN)

(73) Assignee: BEIJING MICROLIVE VISION TECHNOLOGY CO., LTD, Beijing (CN)

(*) Notice: Subject to any disclaimer, the term of this patent is extended or adjusted under 35 U.S.C. 154(b) by 0 days.

(21) Appl. No.: 17/018,032

(22) Filed: Sep. 11, 2020

(65) Prior Publication Data
US 2020/0413002 A1 Dec. 31, 2020

Related U.S. Application Data

(63) Continuation of application No. PCT/CN2019/116749, filed on Nov. 8, 2019.

(30) Foreign Application Priority Data

Nov. 8, 2018 (CN) .......................... 201811325224.4

(51) Int. Cl.
*H04N 5/78* (2006.01)
*H04N 5/915* (2006.01)
(Continued)

(52) U.S. Cl.
CPC ........... *H04N 5/915* (2013.01); *G11B 27/005* (2013.01); *G11B 27/34* (2013.01); *H04N 5/92* (2013.01)

(58) Field of Classification Search
CPC .......... H04N 5/915; H04N 5/92; G11B 27/34; G11B 27/005
(Continued)

(56) References Cited

U.S. PATENT DOCUMENTS

2015/0002701 A1 1/2015 Mayuzumi
2015/0172540 A1* 6/2015 Tomita ................... G11B 27/28
386/241
(Continued)

FOREIGN PATENT DOCUMENTS

CN 104519262 A 4/2015
CN 104660948 A 5/2015
(Continued)

OTHER PUBLICATIONS

International Patent Application No. PCT/CN2019/116749; Int'l Search Report; dated Feb. 1, 2020; 3 pages.

*Primary Examiner* — Robert Chevalier
(74) *Attorney, Agent, or Firm* — BakerHostetler

(57) ABSTRACT

The present disclosure relates to a method, apparatus, device and storage medium for controlling video playback speed. the method includes: receiving a speed adjustment instruction; determining, according to correspondence relationship between the speed adjustment instruction and time length, a first time length corresponding to the speed adjustment instruction; obtaining first video data through an image acquisition apparatus according to the first time length; and compositing the first video data and second video data according to a second time length to obtain third video data, where the second time length is playback time length for the third video data, and a playback screen for the third video data includes a playback screen for the first video data and a playback screen for the second video data The method for controlling the video playback speed proposed in the present disclosure may enable a user to control the playback speed of the recorded video in the composited video on the terminal according to the input speed adjustment instruction.

20 Claims, 7 Drawing Sheets

(51) Int. Cl.
*G11B 27/00* (2006.01)
*G11B 27/34* (2006.01)
*H04N 5/92* (2006.01)
*H04N 5/783* (2006.01)

(58) Field of Classification Search
USPC ........ 386/314, 343, 345, 347, 353, 278, 323
See application file for complete search history.

(56) References Cited

U.S. PATENT DOCUMENTS

| | | | |
|---|---|---|---|
| 2016/0118080 A1* | 4/2016 | Chen | ........................ G06T 7/20 386/344 |
| 2017/0316270 A1 | 11/2017 | Chen et al. | |
| 2018/0035075 A1* | 2/2018 | Lee | ........................ H04N 5/772 |

FOREIGN PATENT DOCUMENTS

| | | | |
|---|---|---|---|
| CN | 104967902 A | 10/2015 | |
| CN | 106792152 A | 5/2017 | |
| CN | 107786827 A | 3/2018 | |
| CN | 108282612 A | 7/2018 | |
| CN | 108566519 A | 9/2018 | |
| CN | 108616696 A | 10/2018 | |
| CN | 108769561 A | 11/2018 | |
| CN | 109525886 A | 3/2019 | |

* cited by examiner

METHOD, APPARATUS, DEVICE AND STORAGE MEDIUM FOR CONTROLLING VIDEO PLAYBACK SPEED

CROSS-REFERENCE TO RELATED APPLICATION

The present disclosure is a continuation of PCT International Application No. PCT/CN2019/116749, filed Nov. 8, 2019, which claims the priority of Chinese Patent Application No. 201811325224.4 filed at the China Intellectual Property Office on Nov. 8, 2018, the entire contents of which are incorporated herein by reference.

TECHNICAL FIELD

The present disclosure relates to the field of multimedia technologies, and in particular to a method, apparatus, device, and storage medium for controlling video playback speed.

BACKGROUND

With development of network technologies and multimedia technologies, using client devices to play and record videos has become one of important applications for current multimedia technologies. Currently, with rapid spread of content-rich multimedia network resources, when using a client device to record and play videos, a user often proposes application requirements of recording and playing different videos at the same time.

However, when the current client realizes simultaneous recording and playing of videos, a playback speed of the recorded video is fixed and cannot be adjusted, and this approach reduces intelligence of human-computer interaction.

SUMMARY

Embodiments of the present disclosure may provide a method, apparatus, device, and storage medium for controlling video playback speed that may effectively adjust a playback speed for a recorded video.

According to a first aspect of the present disclosure, a method for controlling a video playback speed is provided, the method may include:

receiving a speed adjustment instruction;

determining, according to correspondence relationship between the speed adjustment instruction and time length, a first time length corresponding to the speed adjustment instruction;

obtaining first video data through an image acquisition apparatus according to the first time length; and compositing the first video data and second video data according to a second time length to obtain third video data, where the second time length is playback time length for the third video data, and a playback screen for the third video data includes a playback screen for the first video data and a playback screen for the second video data.

In one of embodiments, the compositing the first video data and second video data according to a second time length to obtain third video data includes:

comparing the first time length and the second time length to obtain a comparison result; and compositing the first video data and second video data according to the comparison to obtain the third video data.

In one of embodiments, the compositing the first video data and second video data according to the comparison result to obtain third video data includes:

discarding a part of video data in the first video data according to a difference between the first time length and the second time length to obtain the fourth video data, in a case that the comparison result is that the first time length is greater than the second time length; and compositing the fourth video data and second video data to obtain the third video data.

In one or more embodiments according to the present disclosure, the compositing the first video data and second video data according to the comparison result to obtain third video data includes:

adding a part of video data in the first video data into the first video data according to a difference between the first time length and the second time length to obtain a fifth video data, in a case that the comparison result is that the first time length is less than the second time length; and compositing the fifth video data and second video data to obtain the third video data.

In one or more embodiments according to the present disclosure, the faster the speed corresponding to the speed adjustment instruction is, the longer the first time length is; and the slower the speed corresponding to the speed adjustment instruction is, the shorter the first time length is.

In one or more embodiments according to the present disclosure, the method further includes:

determining playback time for the second video data according to the first time length; and determining according to the correspondence relationship between the first time length and a playback speed, the playback speed for the second video data during the playback time for the second video data.

In one or more embodiments according to the present disclosure, the longer the first time length is, the slower the playback speed is; and the shorter the first time length is, the faster the playback speed is.

In one or more embodiments according to the present disclosure, the determining according to the correspondence relationship between the first time length and a playback speed, the playback speed for the second video data during the playback time for the second video data, includes:

dividing the first time length by a standard playback time length to obtain a quotient, where the standard playback time length is a time length when the second video data is played at a common playback speed; and determining a playback speed for the second video data matching the quotient according to the quotient.

In one or more embodiments according to the present disclosure, the method may further include:

determining, according to correspondence relationship between the standard playback time length and the second time length, the playback speed of the second video data in the playback screen of the third video data.

In one or more embodiments according to the present disclosure, the obtaining first video data through an image acquisition apparatus according to the first time length, includes:

receiving a plurality of initiation-control instructions and a plurality of corresponding termination-control instructions input successively by a user, where the initiation-control instruction is used to indicate a start time for recording each piece of video data, and the termination-control instruction is used to indicate an end time for terminating the recording each piece of video data;

determining the third length of time for recording each piece of video data according to the start time and the end time; and obtaining the first video data according to the third time length and the first time length.

In one or more embodiments according to the present disclosure, the obtaining the first video data according to the third time length and the first time length, includes:

obtaining a plurality of pieces of video data corresponding to the third time length, and compositing a plurality of pieces of video data corresponding to the third time length to obtain the first video data.

According to a second aspect of the present disclosure, an apparatus for controlling a video playback speed is provided, the apparatus may include:

a receiving module, configured to receive a speed adjustment instruction;

a determining module, configured to determine, according to correspondence relationship between the speed adjustment instruction and time length, a first time length corresponding to the speed adjustment instruction;

an obtaining module, configured to obtain first video data through an image acquisition apparatus according to the first time length; and a compositing module, configured to composite the first video data and second video data according to a second time length to obtain third video data, where the second time length is playback time length for the third video data, and a playback screen for the third video data includes a playback screen for the first video data and a playback screen for the second video data.

In a third aspect of the present disclosure, a computer device is provided, where the computer device includes a memory and a processor, the memory stores a computer program, and the processor, when executing the computer program, implements the following steps:

receiving a speed adjustment instruction;

determining, according to correspondence relationship between the speed adjustment instruction and time length, a first time length corresponding to the speed adjustment instruction;

obtaining first video data through an image acquisition apparatus according to the first time length; and compositing the first video data and second video data according to a second time length to obtain third video data, where the second time length is playback time length for the third video data, and a playback screen for the third video data includes a playback screen for the first video data and a playback screen for the second video data.

In a fourth aspect of the present disclosure, a computer readable storage medium is provided, which stores a computer program that implements, when executed by a processor, the following steps:

receiving a speed adjustment instruction;

determining, according to correspondence relationship between the speed adjustment instruction and time length, a first time length corresponding to the speed adjustment instruction;

obtaining first video data through an image acquisition apparatus according to the first time length; and compositing the first video data and second video data according to a second time length to obtain third video data, where the second time length is playback time length for the third video data, and a playback screen for the third video data includes a playback screen for the first video data and a playback screen for the second video data.

Embodiments of the present disclosure provide a method, apparatus, device and storage medium for controlling video playback speed. the method includes: receiving a speed adjustment instruction; determining, according to correspondence relationship between the speed adjustment instruction and time length, a first time length corresponding to the speed adjustment instruction; obtaining first video data through an image acquisition apparatus according to the first time length; and compositing the first video data and second video data according to a second time length to obtain third video data, where the second time length is playback time length for the third video data, and a playback screen for the third video data includes a playback screen for the first video data and a playback screen for the second video data. Since in this procedure, a corresponding first time length may be determined through the speed adjustment instruction, the first video data may be obtained according to the first time length, and the playback speed for the first video data in a screen for the composited video may be determined through the first time length when a terminal composites the first video data and the second video data and plays those in one screen, the playback speed for the first video data in the composited video may be adjusted accordingly, based on different adjustment of the first time length, through setting different speed adjustment instructions, that is, through determining different first time lengths. Therefore, the method for controlling video playback speed proposed in the present disclosure improves human-computer interaction.

DETAILED DESCRIPTION

In order to make purposes, technical solutions, and advantages of the present disclosure clearer, the following further describes the present disclosure in detail with reference to the accompanying drawings and embodiments. It should be understood that the specific embodiments described herein are only used to explain the present disclosure, but not used to limit thereto.

Figure 1:
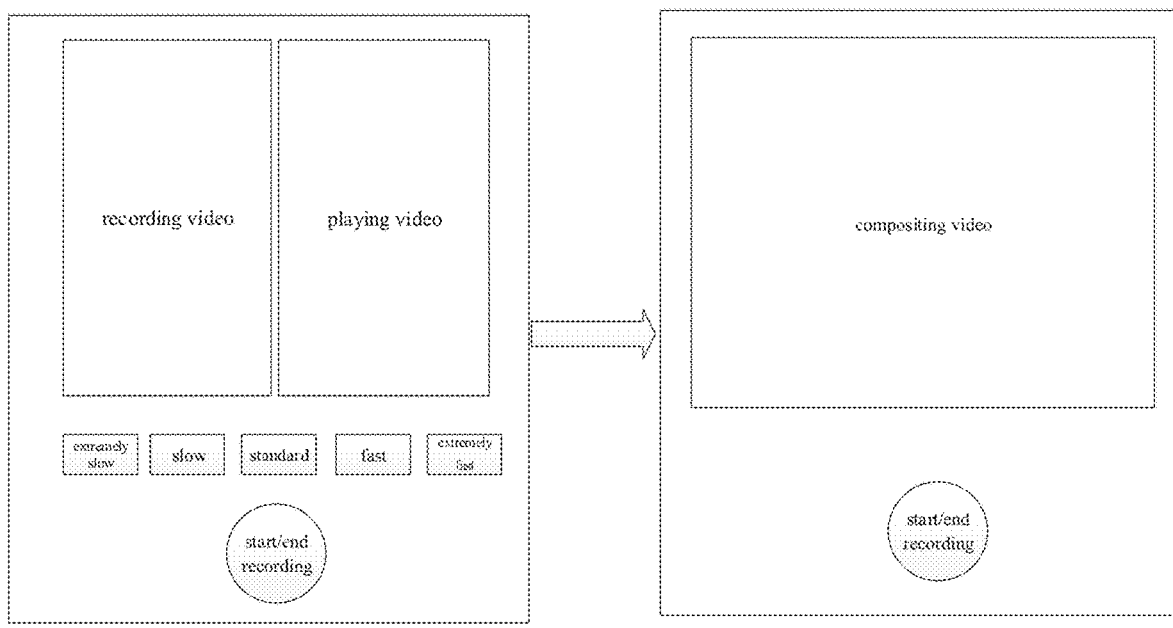
FIG. 1 is a schematic diagram of an application scenario of a method for controlling video playback speed.

The method for controlling video playback speed provided by embodiments of the present disclosure is applicable to the application scenario shown in FIG. 1, and the application scenario describes a screen display interface of a terminal device during and after recording divide videos. The specific display interface may include a display interface for recording video, a display interface for playing video, and a display interface for a composite video. When a user uses the terminal device to record and play a divide video synchronously, the divide video is recorded and played synchronously on the screen of the terminal device. For example, when a user clicks a start recording button on a divide video interface, the terminal device (for example, a mobile phone) starts to collect image data through a camera, display a recorded video on the left interface of the display, and play a pre-recorded or downloaded playback video on the right interface of the display; when the user clicks an end button, the recording is completed, and the terminal may composite the recorded video and the playback video, play the composited video, and display a screen for the composited video on the display. The terminal device may be, but is not limited to, various personal computers, notebook computers, smart phones, tablet computers, and portable wearable devices, etc., which is not limited in the present disclosure.

It should be noted that, for the method for controlling video playback speed provided by the embodiments of the present disclosure, an execution body may be a terminal, and the specific form thereof may be a mobile phone, an iPad, a computer, etc.

The application scenario of the divide video synchronous play technology is that a video may be played on a display of a terminal device while a video may be recorded simultaneously. For example, when the divide video is recorded and played synchronously on the screen of the terminal device, after a user clicks a start recording button on a divide video interface, the terminal device (for example, a mobile phone) starts to collect image data through a camera, display a recorded video on the left interface of the display, and play a pre-recorded or downloaded playback video on the right interface of the display; when the user clicks an end button, the recording is completed, and the terminal may composite the recorded video and the playback video, and play the composited video. However, in the above method, the user cannot control playback speed for the recorded video in the composited video, so that interaction of the divide video is not enough, and human-computer interaction is not intelligent. The embodiments of the present disclosure provide a method for controlling video playback speed, which intends to solve a problem that a playback speed for a recorded video cannot be controlled when a terminal plays a divide video.

The technical solution of the present disclosure may be described in detail below with specific embodiments. The following several specific embodiments may be combined with each other, and the same or similar concepts or processes may not be repeated in some embodiments.

Figure 2:
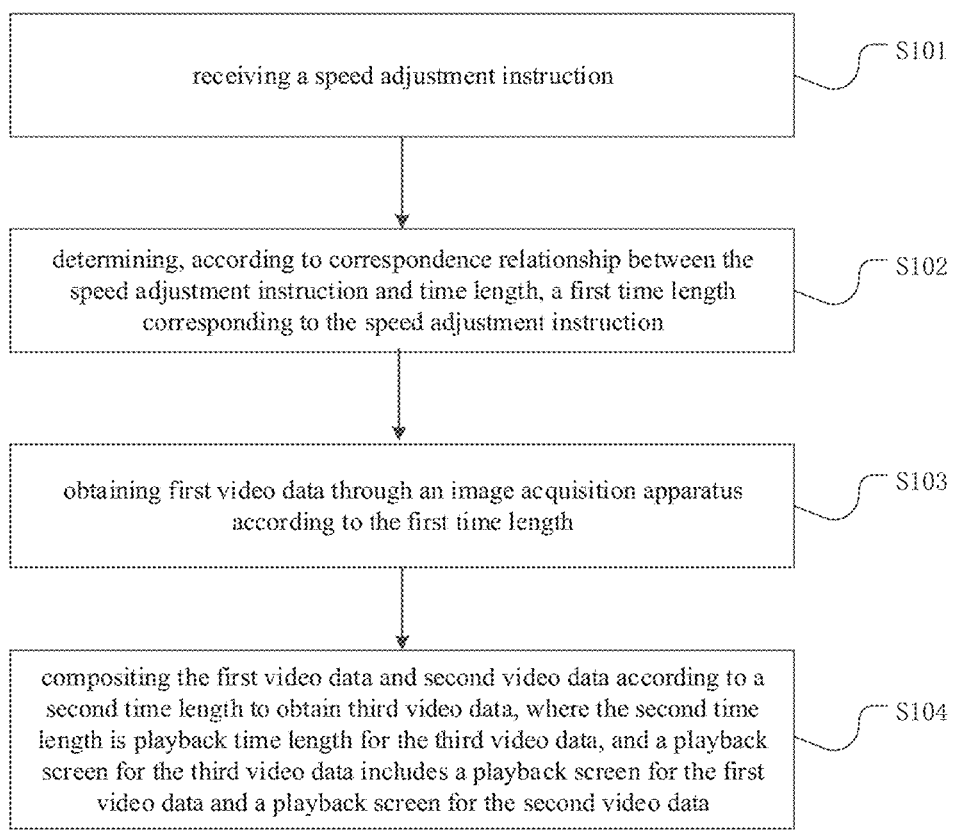
FIG. 2 is a schematic flowchart of a method for controlling video playback speed according to an embodiment of the present disclosure.

FIG. 2 is a schematic flowchart of a method for controlling video playback speed provided by one embodiment. This embodiment relates to a specific process of controlling a playback speed of a recorded video when a terminal records a divide video. As shown in FIG. 2, the method may include the following steps.

S101: a speed adjustment instruction is received.

The speed adjustment instruction is used to instruct the terminal to adjust the playback speed for the recorded video, which may characterize fastness or slowness of a video playback speed. For example, the speed adjustment instruction may be an adjustment instruction such as extremely fast, fast, slow, extremely slow, standard, etc.

In this embodiment, before a user uses a terminal to record a divide video, the user may first input a speed adjustment instruction on the terminal, and the terminal may receive the input speed adjustment instruction and then perform speed control on the recorded video on the terminal according to the speed adjustment instruction, to make the playback speed for the recorded video on the terminal consistent with a speed represented by the speed adjustment instruction entered by the user, so that the user may control the speed for the recorded video through the terminal. There is much approaching for the user to input the speed adjustment instruction; the user may click a speed adjustment control on a touch screen of the terminal to input the speed adjustment instruction, and alternatively, the user may also input the speed adjustment instruction by voice input. No limitation is made thereto in this embodiment. For example, as shown in FIG. 1, the user may click on the "extremely fast" control on the touch screen of the terminal on the left side of the figure to adjust the speed into an extremely fast mode when the recorded video in the display area is played in the interface on the left side of the figure.

S102: according to correspondence relationship between the speed adjustment instruction and time length, a first time length corresponding to the speed adjustment instruction is determined.

The time length refers to a time length during which a piece of video is recorded. The first time length refers to a length of recording time of the recorded time displayed on the display of the terminal when the terminal records a divide video, that is, a time length for an image acquisition apparatus in the terminal to collect data on a photographed target object. The correspondence relationship between the speed adjustment instruction and the time length may be stored in the terminal in advance, so that the terminal may determine the recording time length for the corresponding recorded video according to the speed adjustment instruction. One speed adjustment instruction uniquely corresponds to one time length. For example, if the speed adjustment instruction is extremely fast, the corresponding time length may be 40 seconds; if the speed adjustment instruction is fast, the corresponding time length may be 20 seconds; if the speed adjustment instruction is standard, the corresponding time length may be 10 seconds; if the speed adjustment instruction is slow, the corresponding time length may be 5 seconds; if the speed adjustment instruction is extremely slow, the corresponding time length may be 2.5 seconds.

In this embodiment, when the user uses the terminal to record a divide video, and when the user may first input a speed adjustment instruction on the terminal and the terminal receives the speed adjustment instruction input by the user in a case that the user needs to control the playback speed for the recorded video through the terminal, the first time length corresponding to the obtained speed adjustment instruction may be determined according to the correspondence relationship between the speed adjustment instruction and the time length pre-stored on the terminal, and the terminal then controls an image data collection apparatus thereon to realize collecting of image data for a captured target object, where the collecting time for the image data is equal to the first time length. For example, if the user uses a mobile phone terminal to record a divide video and the user clicks on an extremely slow control on the display of the mobile terminal device, the time length corresponding to the speed adjustment instruction, that is, the extremely slow control, obtained by the mobile phone terminal is 5 seconds, and the capturing time of the camera on the mobile phone terminal is 5 seconds.

S103: the first video data is obtained through an image acquisition apparatus according to the first time length.

The image acquisition apparatus is used to acquire image data or video data captured by the photographing device. For example, the image acquisition apparatus may be a camera on a mobile phone terminal device. In this embodiment, the execution subject terminal is provided with an image acquisition apparatus for collecting image data or video data of the target object being photographed. The first video data is data of the recorded video that is collected when the image acquisition apparatus on the terminal captures the target object during the terminal performs divide video recording.

In this embodiment, when the user records the divide video on the terminal and needs to control the playback speed for the recorded video at the same time, the user inputs a speed adjustment instruction to the terminal; after the terminal receives the speed adjustment instruction and obtains the first time length corresponding to the speed adjustment instruction according to the speed adjustment instruction, the terminal may determine the recording time length for the recorded video according to the first time length, and then control the image acquisition apparatus to collect image data for the recording time length of the photographed target object; and finally, the first video data acquired from the image acquisition apparatus is the image data acquired by the image acquisition apparatus.

S104: the first video data and second video data is composited according to a second time length to obtain third video data, where the second time length is playback time length for the third video data, and a playback screen for the third video data includes a playback screen for the first video data and a playback screen for the second video data.

The second time length refers to the playback time length for the composited video after the terminal performs the compositing of the recorded video and the playback video. The second video data is data of the playback video that is displayed on the terminal display at the same time as the recorded video when the terminal performs divide video recording. The playback video data may be pre-stored recorded video data on the terminal, and optionally, it may also be the video data obtained by downloading from a network after the terminal is connected to the network, and optionally, it may also be video data transmitted from other terminal devices through other communication connection mode, which is not limited in this embodiment. The third video data is data of the composited video through the terminal using an image processing apparatus to composite the recorded video data and the playback video data after obtaining the recorded video data and the playback video data.

In this embodiment, the terminal obtains the first video data according to the first time length, and after obtaining the second video data, composites the obtained first video data and the second video data according to the second time length to generate third video data, so that the terminal may control the player to perform video playback for the third video data, and the time length for playing the third video data is the second time length. The playback screen for the first video data and the playback screen for the second video data are displayed in the playback screen for the third video data.

In the above embodiment, the terminal receives a speed adjustment instruction, determines, according to correspondence relationship between the speed adjustment instruction and time length, a first time length corresponding to the speed adjustment instruction, obtains first video data through an image acquisition apparatus according to the first time length, and composites the first video data and second video data according to a second time length to obtain third video data, where the second time length is playback time length for the third video data, and a playback screen for the third video data includes a playback screen for the first video data and a playback screen for the second video data. Since in this procedure, a corresponding first time length may be determined through the speed adjustment instruction, the first video data may be obtained according to the first time length, and the playback speed for the first video data in a screen for the composited video may be determined through the first time length when a terminal composites the first video data and the second video data and plays those in one screen, the playback speed for the first video data in the composited video may be adjusted accordingly, based on different adjustment of the first time length, through setting different speed adjustment instructions, that is, through determining different first time lengths. Therefore, the method for controlling video playback speed proposed in the present disclosure improves human-computer interaction.

Optionally, in an embodiment according to the present disclosure, the faster the speed corresponding to the speed adjustment instruction is, the longer the first time length is; and the slower the speed corresponding to the speed adjustment instruction is, the shorter the first time length is.

In this embodiment, the speed adjustment instruction may characterize the speed. If the speed indicated by the speed adjustment instruction is slower, the corresponding first time length is shorter. Correspondingly, the faster the speed indicated by the speed adjustment instruction is, the longer the corresponding time length is. For example, if the common recording time for a video is 10 seconds, when the speed adjustment instruction is extremely slow, the recording time length corresponding to the extremely slow speed adjustment instruction becomes 5 seconds; when the speed adjustment v is extremely fast, then the recording time length corresponding to the extremely fast speed adjustment instruction becomes 50 seconds. It should be noted that the numerical correspondence relationship between the speed represented by a specific speed adjustment instruction and the length of the first time length may be preset according to a certain multiple relationship, and the specific multiple relationship may be customized.

Figure 3:
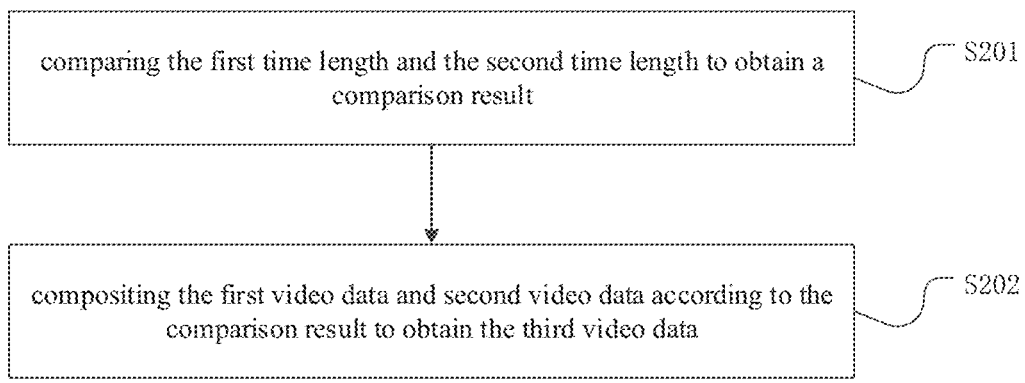
FIG. 3 is a schematic flowchart of an implementation manner of S104 in the embodiment of FIG. 2.

FIG. 3 is a schematic flowchart of an implementation manner of S104 in the embodiment of FIG. 2, and this embodiment mainly relates to the specific process of the terminal compositing the first video data and the second video data according to the second time length. On the basis of the foregoing embodiment, as shown in FIG. 3, the above S104 "the compositing the first video data and second video data according to a second time length to obtain third video data" may include the following steps.

S201: the first time length and the second time length are compared to obtain a comparison result.

In this embodiment, the first time length refers to the length of time that the image data acquisition apparatus on the terminal collects image data when the terminal is recording the divide video, that is, the recording time of the video recorded by the terminal. The second time length refers to the length of the playback time when the terminal composites the recorded video and the playback video to generate composited video data after completing the divide video recording, and controls the player on the terminal to play the composited video data. The second time length may be equal to the length of playing time for the second video data. The second time length may be a time length preset by the terminal. The specific time length may be set according to actual needs, or it may be the playback time length for the acquired second video data, which may be 15 seconds, 10 seconds, or 20 seconds, which is not limited in this embodiment. Comparing the first time length with the second time length, if the comparison result is that the first time length is greater than the second time length, it means that the recording time length for the recorded video is greater than the playback time length of the composited video; if the comparison result is the first time length If the length is less than the second time length, it means that the recording time length for the recorded video is less than the playback time length of the composited video. If the comparison result is that the first time length is equal to the second time length, it means that the recording time length for the recorded video is equal to the playback time length of the composited video.

S202: the first video data and second video data is composited according to the comparison result to obtain the third video data.

In this embodiment, if the comparison result is that the first time length is greater than the second time length, or the first time length is less than the second time length, the terminal uses the image data processing apparatus to perform data processing on the first video data, for example, dropping or adding frames in processing video stream data to make the playback time length for the first video data in the playback screen for the third video data equal to the second time length, that is, the playback time length of the third video data. Based on the above two comparison results, after processing the first video data, the terminal performs compositing on the processed first video data and the second video data to obtain composited video data, that is, the third video data. In addition, if the comparison result is that the first time length is equal to the second time length, the terminal directly performs compositing on the first video data and the second video data to obtain the composited video data, that is, the third video data.

In the above embodiment, the comparison result is obtained by comparing the first time length with the second time length; the first video data and second video data is composited according to the comparison result to obtain the third video data. Since the first time length is determined according to the speed adjustment instruction, the comparison result of the first time length and the second time length may be determined according to the speed adjustment instruction, and the comparison result of the first time length and the second time length may be further used to process the first video data and the second video data to obtain the third video data, so that the terminal may control the playback speed for the first video data through the speed adjustment instruction, and improve the human-machine interaction.

Specifically, in the foregoing embodiment, there may be a plurality of comparison results between the first time length and the second time length, and according to different comparison results, methods for the terminal to composite the first video data and the second video data are different. The following embodiments may specifically describe methods for compositing the first video data and the second video data in the case of different comparison results.

Figure 4:
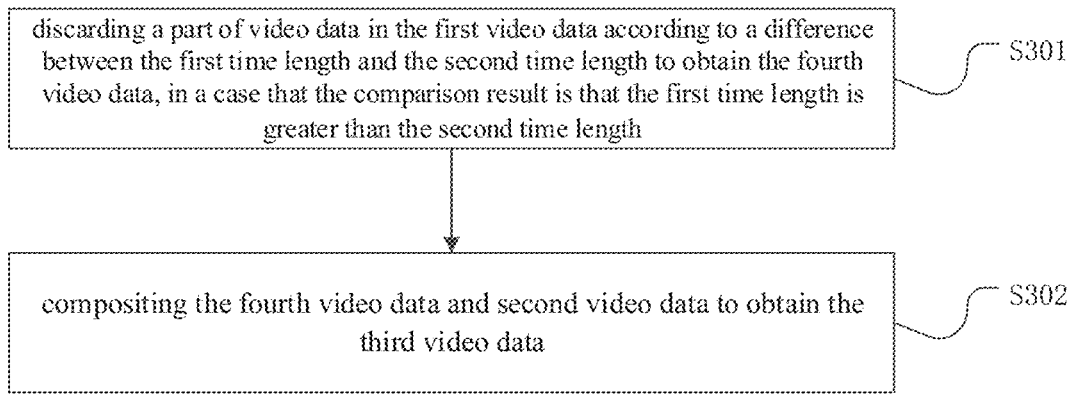
FIG. 4 is a schematic flowchart of a method for controlling video playback speed according to an embodiment of the present disclosure.

Optionally, in one of embodiments, if the comparison result is that the first time length is greater the second time length, as shown in FIG. 4, the compositing the first video data and second video data according to the comparison result to obtain third video data includes:

S301: a part of video data in the first video data is discarded according to a difference between the first time length and the second time length to obtain the fourth video data, in a case that the comparison result is that the first time length is greater than the second time length.

In this embodiment, when the comparison result is that the first time length is greater than the second time length, the terminal may first obtain the difference value between the first time length and the second time length from the comparison result, and if the difference value is a positive value, when the terminal performs data processing on the first video data, a part of the video data may be discarded on the basis of the first video data to generate new video data, that is, the fourth video data. The discarded part of the video data may be determined according to the difference value between the first time length and the second time length obtained by the terminal. Since this method discards part of the data on the basis of the first video data, the playback speed for the fourth video data in the playback screen for the third video data becomes faster than the playback speed for the first video data in the playback screen for the third video data. Therefore, the terminal may adjust the playback speed for the first video data according to the comparison result that the first time length is greater than the second time length. For example, in a case that a user uses a mobile phone terminal to record a divide video, when the user clicks on the extremely fast control to adjust the speed of the recorded video, the recording time for the recorded video corresponding to the speed adjustment instruction of the extremely fast control is 50 seconds, the playback time of the composited video of the recorded video and the playback video is 10 seconds, and the difference value between the recording time for the recorded video and the playback time for the composited video is 40 seconds; accordingly, when the mobile phone terminal processes the recorded video data, it may discard 40 seconds of video data from the recorded video data correspondingly, so that the playback time for the recorded video data in the playback screen of the composited video data is consistent with the playback time for the composited video data. After the mobile phone terminal performs discarding on the recorded video data, the playback speed for the recorded video in the playback screen for the composited video data becomes faster accordingly. It should be noted that the method of discarding video data on the basis of the first video data may adopt a method of discarding adjacent frame images. For example, when a user uses a mobile phone terminal to record a divide video, if the recorded video is recorded at a common speed, the total number of frames of the recorded video is 50 frames. When the user clicks the extremely fast control to adjust the playback speed for the recorded video, the recording time becomes longer, and the total number of frame images of the recorded video becomes 100 frames due to the longer recording time, so that the mobile phone terminal needs to discard 50 frames of images on the basis of frame images of the recorded video, to make the playback time length for the recorded video equal to the playback time length when the mobile phone terminal composites videos. Specifically, when an image processing apparatus of the mobile phone terminal processes the recorded video data, it discards one of adjacent frame images in frame images of the recorded video with a total number of 100 frames, that is, discards 1 frame image for every 2 frames of image until the total number of frames of the recorded video becomes 50 frames of images, to form new recorded video data. The playback speed for the new recorded video data during video playback is faster than that of the original recorded video, while maintaining good video continuity.

S302: the fourth video data and second video data is composited to obtain the third video data.

In this embodiment, after the terminal obtains the fourth video data according to the comparison result that the first time length is greater than the second time length, the third video data is obtained by compositing the fourth video data and second video data. The playback screen for the fourth video data and the playback screen for the second video data are included in the playback screen for the third video data. The fourth video data is video data after the terminal image processing apparatus performs data discarding processing on the first video data.

Figure 5:
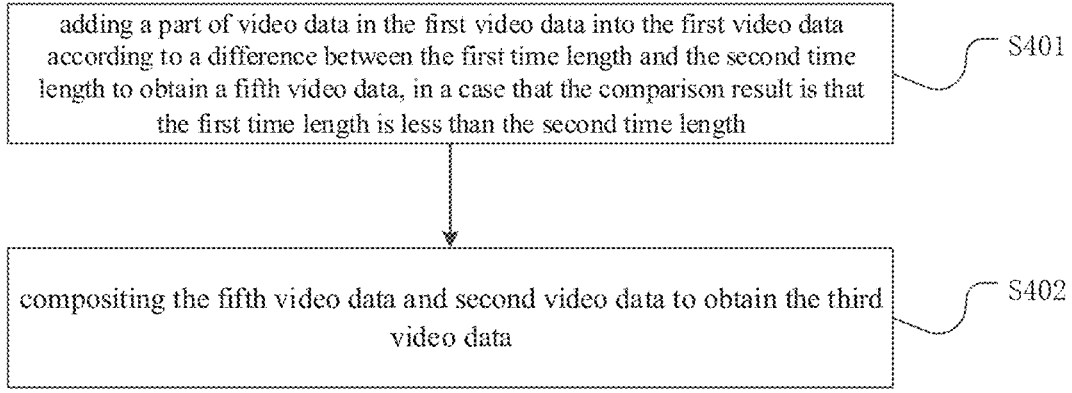
FIG. 5 is a schematic flowchart of a method for controlling video playback speed according to an embodiment of the present disclosure.

Optionally, in one or more embodiments according to the present disclosure, if the comparison result is that the first time length is less the second time length, as shown in FIG. 5, the compositing the first video data and second video data according to the comparison result to obtain third video data may include the following steps.

S401: a part of video data in the first video data is added into the first video data according to a difference between the first time length and the second time length to obtain a fifth video data, in a case that the comparison result is that the first time length is less than the second time length.

In this embodiment, when the comparison result is that the first time length is less than the second time length, the terminal may first obtain the difference value between the first time length and the second time length from the comparison result, and if the difference value is a negative value, when the terminal performs data processing on the first video data by using the image processing apparatus, a part of the video data may be added on the basis of the first video data to generate new video data, that is, the fifth video data. The added part of the video data may be determined according to the difference value between the first time length and the second time length obtained by the terminal. Since this method adds a part of the data on the basis of the first video data, which corresponds to repeating a part of the first video data, the playback speed for the fifth video data in the playback screen for the third video data becomes slower than the playback speed for the first video data in the playback screen for the third video data. Therefore, the terminal may adjust the playback speed for the first video data according to the comparison result that the first time length is less than the second time length. For example, in a case that a user uses a mobile phone terminal to record a divide video, when the user clicks on the extremely slow control to adjust the speed of the recorded video slower, the recording time for the recorded video corresponding to the speed adjustment instruction of the extremely slow control is 5 seconds, the playback time of the composited video of the recorded video and the playback video is 10 seconds, and the difference value between the recording time for the recorded video and the playback time for the composited video is negative 5 seconds; accordingly, when the mobile phone terminal processes the recorded video data, it may add 5 seconds of video data from the recorded video data correspondingly, so that the playback time for the recorded video data in the playback screen of the composited video data is consistent with the playback time for the composited video data. After the mobile phone terminal performs adding on the recorded video data, the playback speed for the recorded video in the playback screen for the composited video data becomes slower accordingly. It should be noted that the method of adding video data on the basis of the first video data may adopt a method of using repeated frames. For example, when a user uses a mobile phone terminal to record a divide video, if the recorded video is recorded at a v speed, the total number of frames of the recorded video is 100 frames. When the user clicks the extremely slow control to adjust the playback speed for the recorded video, the recording time becomes shorter, and the total number of frame images of the recorded video becomes 50 frames due to the longer recording time, so that the mobile phone terminal needs to add 50 frames of images on the basis of frame images of the recorded video, to make the playback time length for the recorded video equal to the playback time length when the mobile phone terminal composites videos. Specifically, when an image processing apparatus of the mobile phone terminal processes the recorded video data, it copies respective frame images of the recorded video with a total number of 50 frames, that is, adds the copied respective frame images of the recorded video with a total number of 50 frames into respective frame images in the first video data, to form new recorded video data. The playback speed for the new recorded video data during video playback is slower than that of the original recorded video, while maintaining good video continuity.

S402: the fifth video data and second video data is composited to obtain the third video data.

In this embodiment, after the terminal obtains the fifth video data according to the comparison result that the first time length is less than the second time length, the third video data is obtained by compositing the fifth video data and second video data. The playback screen for the fifth video data and the playback screen for the second video data are included in the playback screen for the third video data. The fifth video data is video data after the terminal image processing apparatus performs data adding processing on the first video data.

In the above embodiment, a part of video data in the first video data is discarded according to a difference between the first time length and the second time length to obtain the fourth video data, in a case that the comparison result is that the first time length is greater than the second time length; the third video data is obtained by compositing the fourth video data and the second video data. A part of video data in the first video data is added into the first video data according to a difference between the first time length and the second time length to obtain the fifth video data, in a case that the comparison result is that the first time length is less than the second time length; the third video data is obtained by compositing the fifth video data and the second video data. Since this method may process the first video data and form new video data (that is, the fourth video data or the fifth video data) based on the difference between the first time length and the second time length, the terminal may directly convert the first video data into the fourth video data or the fifth video data according to the difference value between the first time length and the second time length, so as to realize speed control for playing of the first video data in the playback screen for the third video data. In addition, the method is simple and practical.

According to the embodiment of the present disclosure, the compositing the first video data and the second video data to obtain the third video data according to the comparison result may also include the case where the comparison result is that the first time length is equal to the second time length. In this case, it means that when the user uses the terminal to record a divide video, the playback speed for the recorded video is not adjusted, so that the terminal may directly composite the first video data and the second video data to obtain the third video data, that is, the composited video data. The terminal then controls the player to play the screen of the composited video data, and the playback speed for the screen of the first video data remains unchanged at the original playback speed.

In addition, in one embodiment, the playback speed for the recorded video may be controlled by directly changing the playback speed for frames of the first video data while keeping the frames of the recorded first video data unchanged.

Figure 6:
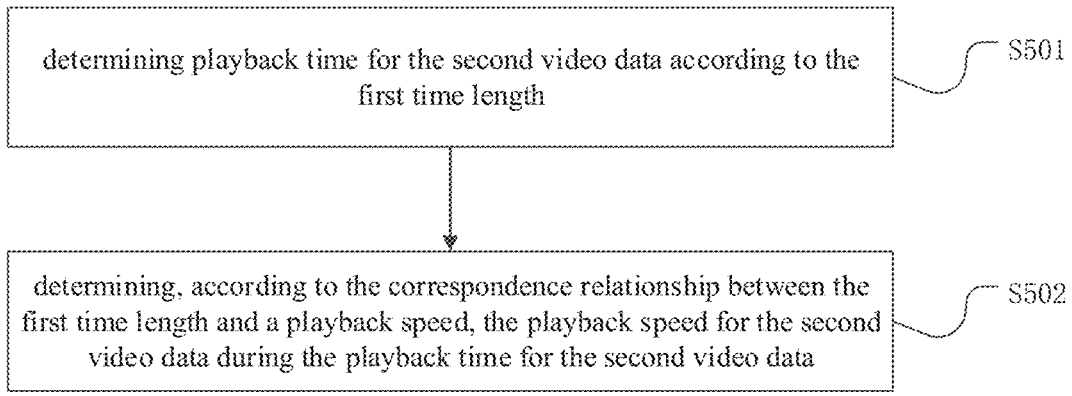
FIG. 6 is a schematic flowchart of a method for controlling video playback speed according to an embodiment of the present disclosure.

On the basis of the embodiment in FIG. 2, the method for controlling the playback speed for the recorded video, in one or more embodiments of the present disclosure, as shown in FIG. 6, the method may further include the following steps.

S501: the playback time for the second video data is determined according to the first time length.

In this embodiment, when the user uses the terminal to record video, the terminal uses the image acquisition apparatus to collect the first video data. In this process, the terminal may display a video screen for the second video data pre-stored on the terminal or the second video data pre-downloaded from a network, and the playback time for the second video data may be determined according the first time length for the recorded video, that is, the playback time for the second video data is the first time length.

S502: the playback speed for the second video data during the playback time for the second video data is determined according to the correspondence relationship between the first time length and the playback speed.

The playback speed refers to the playback speed for the playback video screen displayed on the terminal display when the user uses the terminal to record the video. The correspondence relationship between the first time length and the playback speed may be pre-stored on the terminal. Optionally, a first time length uniquely corresponds to a playback speed, which the longer the first time length is, the slower the corresponding playback speed is, and the shorter the first time length is, the faster the corresponding playback speed is. For example, if the first time length is 15 s, the corresponding playback speed is the standard speed; if the first time length is 10 s, the corresponding playback speed is fast; if the first time length is 5 s, the corresponding playback speed is extremely fast; correspondingly, if the first time length is 20 s, the corresponding playback speed is slow; if the first time length is 25 s, the corresponding playback speed is extremely slow.

It should be noted that the specific correspondence relationship between the first time length and the playback speed may be customized by the terminal. Optionally, when the total number of frames corresponding to the playback screen for the second video data remains unchanged, the playback speed for the second video data may also be determined by the first time length. For example, if the number of screen frames corresponding to the playback screen for the second video data is 100 frames, and the first time length is 10 s, the playback screen for the second video data is played at a frame rate of 0.1 s, and if the first time length becomes 5 s, the playback screen for the second video data is played at a frame rate of 0.05 s.

In this embodiment, when the time length for the terminal to record the video, that is, the first time length, is determined, the terminal may determine the playback speed that matches the first time length according to the correspondence relationship between the first time length and the playback speed, so that the terminal may play the second video data at the playback speed.

Figure 7:
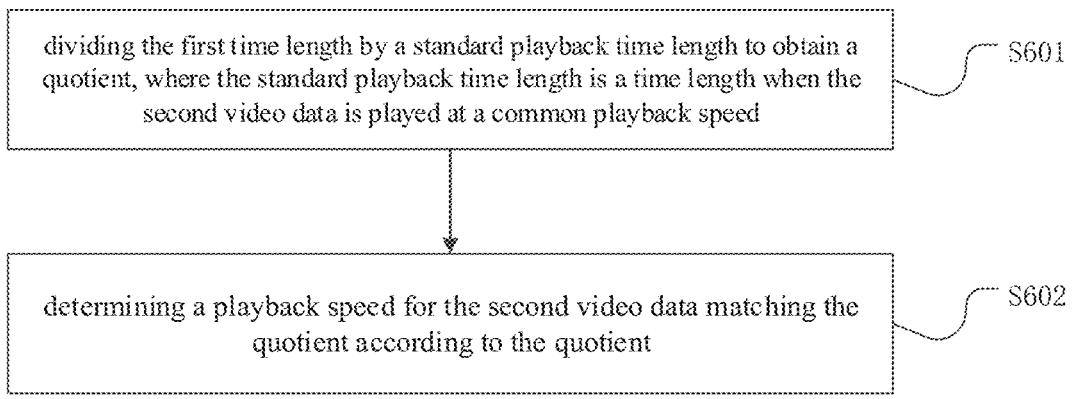
FIG. 7 is a schematic flowchart of a method for controlling video playback speed according to an embodiment of the present disclosure.

According to the embodiment of the present disclosure, as shown in FIG. 7, the above S502 "determining the playback speed for the second video data during the playback time for the second video data according to the correspondence relationship between the first time length and the playback speed", may include the following steps.

S601: the first time length is divided by a standard playback time length to obtain a quotient, where the standard playback time length is a time length when the second video data is played at a common playback speed.

The standard playback time length is the length of time when the second video data is played at common speed, when the terminal is recording the video while playing the second video data. When the terminal is playing the composited video data of the first video data and the second video data, the standard playback time length may be equal to the second time length, that is, the playback time length when the terminal plays the composited video data. Optionally, the standard playback time length may not be equal to the second time length.

S602: the playback speed for the second video data matching the quotient is determined according to the quotient.

In this embodiment, when the first time length is different from the standard playback time length, it means that the recording time for the first video data is different from the playback time for the second video data. However, the terminal needs to simultaneously record the first video and display the second video according to the first time length, and the terminal needs to change the screen playback speed for the second video to ensure that the second video originally played during the standard playback time length may be played during the first time length. In this application scenario, the first time length is divided by a standard playback time length to obtain a quotient ratio, and the terminal further determines the playback speed for the second video data according to the ratio. For example, assuming the first time length, that is, the time length for the terminal to record video, is 20 s, and the standard playback time length is 10 s, then the ratio of the first time length to the standard playback time length is 2. In this case, the playback speed of the terminal displaying the second video data is changed compared with the playback speed of normally playing the second video data, and specifically becomes ½ of the common playback speed.

Therefore, the speed control method for video data proposed in the present disclosure realizes the control of the playback speed for the recorded video data on the one hand, and also realizes the control of the playback speed for the video data in the process of recording a video by controlling the first time length. For example, in the application scenario shown in FIG. 1, when a user uses a mobile phone terminal to record a divide video, the screen of the recorded video and the screen of the playback video are both displayed on the display of the mobile phone terminal; if the user clicks the extremely slow control on the display of the mobile phone terminal, the right interface on the display of the mobile terminal may quickly display the video playback screen; if the user clicks the extremely fast control on the display of the mobile phone terminal, the right interface on the display of the mobile terminal may slowly display the video playback screen.

According to the embodiment of the present disclosure, in a case that the standard playback time length when the second video data is played normally is different from the second time length when the third video data is played, the terminal needs to adjust the playback speed for the second video data when playing the composited video data, which the method may include: determining the playback speed for the second video data in the playback screen for the third video data according to the correspondence relationship between the standard playback tune length and the second time length.

In this embodiment, when the terminal obtains the first video data and the second video data and plays the composited video data, the playback speed for the second video data in the playback screen for the composited video data may be determined according to the correspondence relationship between the standard playback time length and the second time length. For example, when the standard playback time length is equal to the second tune length, the playback speed for the second video data is the standard speed; when the standard playback time length is greater than the second time length, the playback speed for the second video data is fast; when the standard playback time length is less than the second time length, the playback speed for the second video data is slow. When the playback speed for the second video data is changed with respect to the standard speed, the degree to which the playback speed for the second video data becomes faster or slower may be determined by the quotient of the standard playback time length and the second time length. For example, assuming that the standard playback time length is 20 s and the second time length is 10 s, the ratio of the standard playback time length to the second time length is 2. In this case, when the terminal plays the composited video data according to the second time length, the playback speed for the second video data in the playback screen for the video data is faster than the standard speed, and specifically becomes twice than the standard speed.

Figure 8:
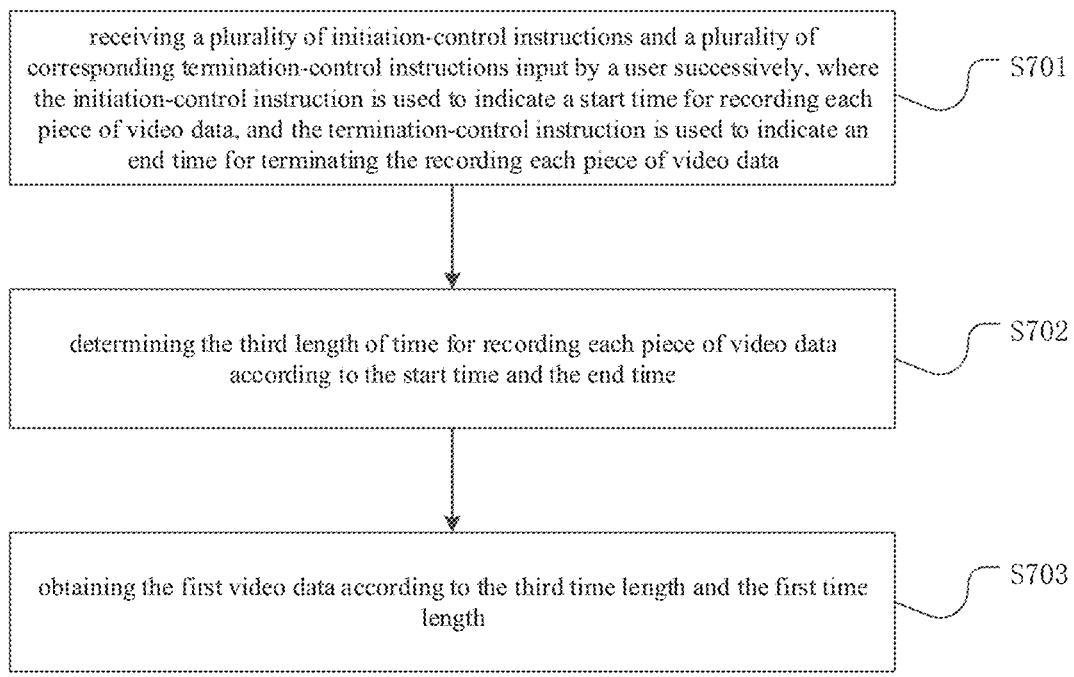
FIG. 8 is a schematic flowchart of an implementation manner of S103 in the embodiment of FIG. 2.

FIG. 8 is a schematic flowchart of the implementation of S103 in the embodiment of FIG. 2. This embodiment relates to the specific process of the terminal obtaining the first video data. As shown in FIG. 8, S103 "obtaining the first video data through the image acquisition apparatus according to the first time length" includes the following steps.

S701: a plurality of initiation-control instructions and a plurality of corresponding termination-control instructions input successively by a user, are received, where the initiation-control instruction is used to indicate a start time for recording each piece of video data, and the termination-control instruction is used to indicate an end time for terminating the recording each piece of video data.

In this embodiment, when a user uses a terminal to record a video, the user may input a plurality of initiation-control instructions and a plurality of corresponding termination-control instructions successively to realize that the video is divided into a plurality of segments for recording in different time periods. Optionally, when the user records the first video data in segments on the terminal, the user may first input the first initiation-control instruction on the terminal to make the terminal start recording the first video data. When the user inputs the termination-control instruction corresponding to the first initiation-control instruction, the terminal ends the recording of the first segment of video data. Then, if the user needs to continue to record a second segment of video data, the user may continue to input the second initiation-control instruction and the second termination-control instruction to make the terminal start recording the second segment of video data and end the recording of the second segment of video data.

It should be noted that there are many ways for the user to input control instructions on the terminal, which may be realized by repeatedly clicking the recording video initial/termination-control on the terminal display to realize the input of control instructions; optionally, it may also be swiped a sliding control on the display of the terminal to realize the input of control instructions; optionally, the input of control instructions may also be realized by voice input, which is not limited in this embodiment. For example, in the application scenario shown in FIG. 1, when the terminal divides the recorded video into 2 segments for recording, the user may click the initial/termination-control on the terminal display, and the terminal starts recording the first segment of video; when the user clicks the initial/termination-control on the terminal display again, the terminal ends the recording of the first segment of video; then the user may click the initial/termination-control on the terminal display again, the terminal starts to continue to record the second segment of video on the basis of the first segment of video until the recording time for the recorded video ends.

S702: the third length of time for recording each piece of video data is determined according to the start time and the end time.

The third time length is the recording time corresponding to respective segments when the recorded video is recorded in a plurality of segments, where the corresponding recording time of respective segments may be the same or different. In this embodiment, the terminal may also determine the time length for recording each segment of video, that is, the third time length, according to the start time and end time when recording each segment of video. Specifically, when the terminal receives the first initiation-control instruction input by the user to start recording a video, the terminal may further obtain the start time for recording the video from the initiation-control instruction, and when the terminal receives the termination-control instruction input by the user to end recording a video, the terminal may further obtain the end time for recording the video from termination-control instruction. Then, the terminal determines the difference value between the end time and the start time as the third time length, that is, the time length for recording the video.

S703: the first video data is obtained according to the third time length and the first time length.

In this embodiment, when the terminal receives a plurality of initiation-control instructions and a plurality of termination-control instructions input successively by the user, the terminal may determine the start time corresponding to each initiation-control instruction and the end time corresponding to each termination-control instruction, and may further determine a plurality of third time lengths, that is, the time lengths for recording a plurality of videos. When the sum of the plurality of third time lengths is equal to the first time length, it indicates that the terminal has completed the recording of all videos, that is, has completed the obtaining of the first video data. Therefore, the third time length is less than or equal to the first time length. In practical applications, when the terminal completes the recording of each segment of video data, it may judge whether the recording of all videos is completed, according to the third time length for recording the video, so that the terminal may obtain the first video data based on all recorded video data. The above judgment method is: the terminal compares the third time length for recording each video with the first time length, and if the third time length of recording each video is less than the first time length, it is judged that the terminal has not completed recording of all videos and needs to continue to record a next video; if the third time length of each video recorded by the terminal is equal to the first time length, it is judged that the terminal has completed recording all videos, and then the first video may be obtained based on all recorded video data.

According to the embodiment of the present disclosure, as described above, when the terminal records a plurality of segments of video data and obtains a plurality of segments of the third time length, and when the sum of the plurality of segments of time length is equal to the first time length, it means that the user ends the recording on the terminal. Then, the terminal may obtain a plurality of video data corresponding to the plurality of third time lengths, and splice the plurality of video data to obtain the first video data.

In the above embodiment, the terminal receives a plurality of initiation-control instructions and a plurality of corresponding termination-control instructions input by the user; and then determines the third time length for recording each segment of video according to the start time included in the initiation-control instruction and the end time included in the termination-control instruction; and finally, obtains the first video data according to the third time length and the first time length. Since in this method, the terminal may set a plurality of third time lengths according to a plurality of initiation-control instructions and a plurality of termination-control instructions input by the user, that is, the terminal may record a plurality of segments of video data, and then splice the plurality of segments of video data to obtain the first video data, the method proposed in the present disclosure enables the user to divide the first video data into a plurality of segments for recording on the terminal, strengthens the interaction between the user and the terminal video, and improves the user's experience of video recording.

It should be noted that when the user divides the recorded video into a plurality of segments for recording on the terminal, the playback speed of the recorded video may be controlled by the input speed adjustment instruction before the recording of each video starts. For the method for controlling the playback speed of each recorded video, reference may be made to the method for controlling the video playback speed described in the embodiment in FIG. 2 above, and the specific processes are not described herein.

It should be understood that although various steps in the flowchart of FIGS. 2 to 8 are shown in sequence as indicated by arrows, these steps are not necessarily executed in sequence as indicated by arrows. Unless explicitly stated herein, the execution of these steps is not strictly limited in sequence but may be performed in other sequences. Moreover, at least a part of the steps in the flowchart of FIGS. 2 to 8 may include a plurality of sub-steps or stages, which are not necessarily completed at the same time, but may be executed at different times, and the execution order thereof is not necessarily sequentially.

Figure 9:
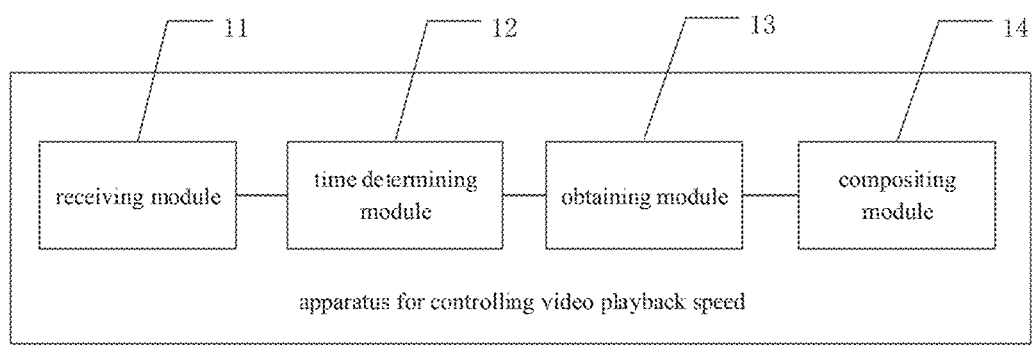
FIG. 9 is a schematic diagram of an apparatus for controlling video playback speed according to an embodiment of the present disclosure.

FIG. 9 is a schematic diagram of an apparatus for controlling video playback speed provided by an embodiment. As shown in FIG. 9, the apparatus includes: a receiving module 11, a time determining module 12, an obtaining module 13, and a compositing module 14, where:

the receiving module 11 is configured to receive a speed adjustment instruction;

the determining module 12 is configured to determine, according to correspondence relationship between the speed adjustment instruction and time length, a first time length corresponding to the speed adjustment instruction;

the obtaining module 13 is configured to obtain first video data through an image acquisition apparatus according to the first time length; and the compositing module 14 is configured to composite the first video data and second video data according to a second time length to obtain third video data, where the second time length is playback time length for the third video data, and a playback screen for the third video data includes a playback screen for the first video data and a playback screen for the second video data.

Figure 10:
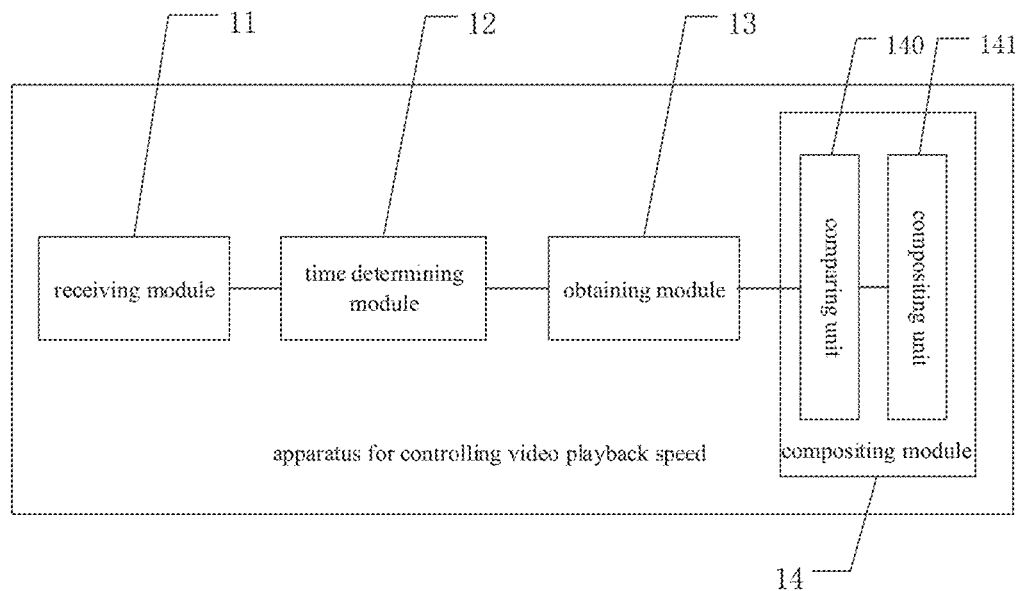
FIG. 10 is a schematic diagram of an apparatus for controlling video playback speed according to an embodiment of the present disclosure.

In one of the embodiments, as shown in FIG. 10, based on the apparatus for controlling video playback speed described in FIG. 9, the compositing module 14 includes:

a comparing unit 140, configured to compare the first time length and the second time length to obtain a comparison result; and a compositing unit 141 configured to composite the first video data and second video data according to the comparison to obtain the third video data.

In one of embodiments, based on the apparatus for controlling video playback speed described in FIG. 10, the compositing unit 141 may be further configured to discard a part of video data in the first video data according to a difference between the first time length and the second time length to obtain the fourth video data, in a case that the comparison result is that the first time length is greater than the second time length; and composite the fourth video data and the second video data to obtain the third video data.

In one of embodiments, based on the apparatus for controlling video playback speed described in FIG. 10, the compositing unit 141 may be further configured to add a part of video data in the first video data into the first video data according to a difference between the first time length and the second time length to obtain the fifth video data, in a case that the comparison result is that the first time length is less than the second time length; and composite the fifth video data and the second video data to obtain the third video data.

In one of embodiments in the present disclosure, the faster the speed corresponding to the speed adjustment instruction is, the longer the first time length is; and the slower the speed corresponding to the speed adjustment instruction is, the shorter the first time length is.

Figure 11:
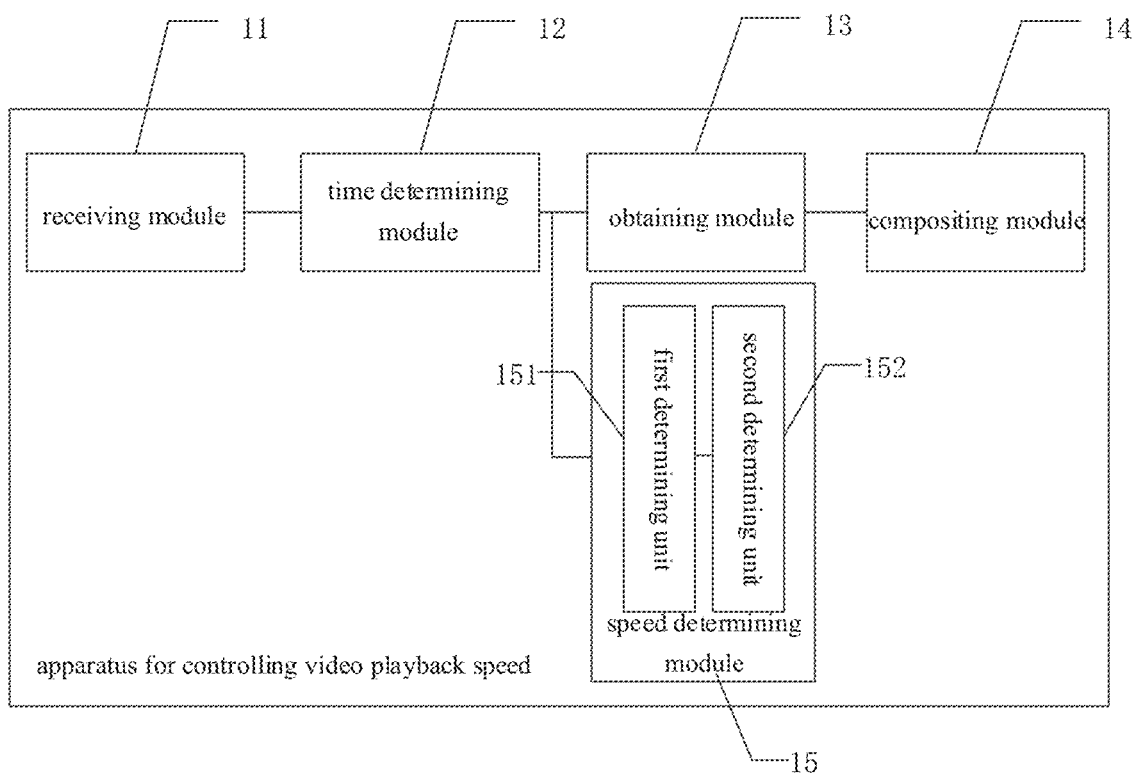
FIG. 11 is a schematic diagram of an apparatus for controlling video playback speed according to an embodiment of the present disclosure.

In one of embodiments, as shown in FIG. 11, the apparatus for controlling video playback speed may further include a speed determining module 15 including:

a first determining unit 151 configured to determine playback time for the second video data according to the first time length; and a second determining unit 152 configured to determine according to the correspondence relationship between the first time length and a playback speed, the playback speed for the second video data during the playback time for the second video data.

In one of embodiments, the longer the first time length is, the slower the playback speed is; and the shorter the first time length is, the faster the playback speed is.

In one of embodiments, the second determining unit 152 may divide the first time length by a standard playback time length to obtain a quotient, where the standard playback time length is a time length when the second video data is played at a common playback speed; and determine a playback speed for the second video data matching the quotient according to the quotient.

In one of embodiments, the second determining unit 152 may further determine, according to correspondence relationship between the standard playback time length and the second time length, the playback speed of the second video data in the playback screen of the third video data.

Figure 12:
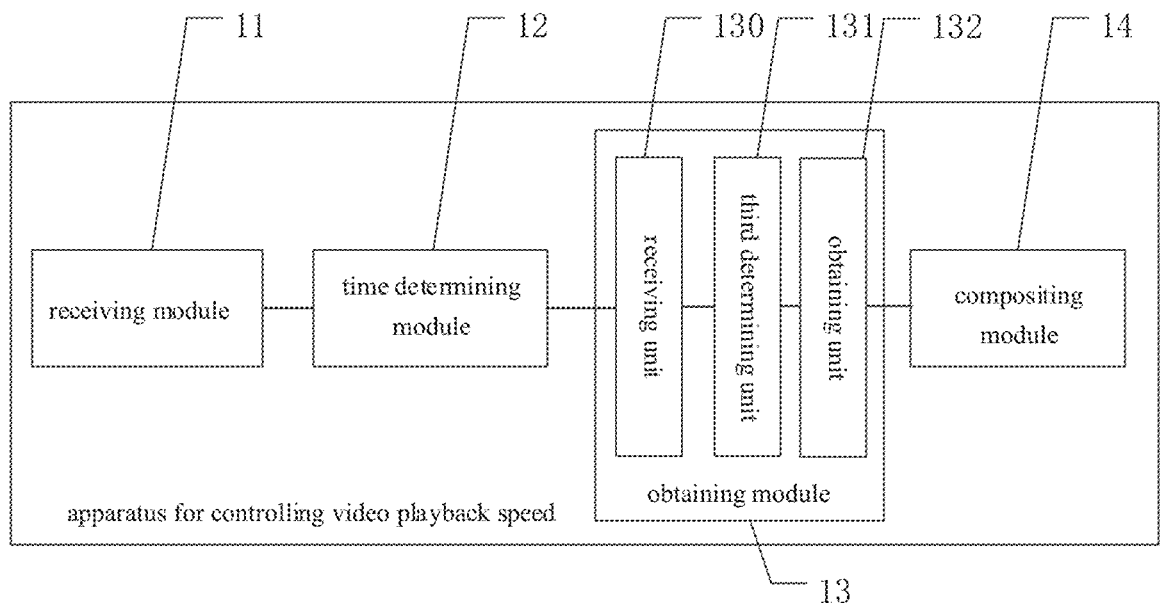
FIG. 12 is a schematic diagram of an apparatus for controlling video playback speed according to an embodiment of the present disclosure.

In one of the embodiments, as shown in FIG. 12, based on the apparatus for controlling video playback speed described in FIG. 9, the obtaining module 13 includes:

a receiving unit 130 configured to receive a plurality of initiation-control instructions and a plurality of corresponding termination-control instructions input successively by a user, where the initiation-control instruction is used to indicate a start time for recording each piece of video data, and the termination-control instruction is used to indicate an end time for terminating the recording each piece of video data;

a third determining unit 131, configured to determine the third length of time for recording each piece of video data according to the start time and the end time; and an obtaining unit 132, configured to obtain the first video data according to the third time length and the first time length.

In one of embodiments, the obtaining unit 132 may obtain a plurality of pieces of video data corresponding to the third time length, and composite a plurality of pieces of video data corresponding to the third time length to obtain the first video data.

The foregoing embodiment provides an apparatus for controlling video playback speed, and its implementation principle and technical effect are similar to those of the foregoing method embodiments, which are not redundant herein.

The specific definition of the apparatus for controlling video playback speed may be referred to the above limitation on the method for controlling video playback speed, which is not redundant herein. The various modules in the above-mentioned apparatus for controlling video speed may be implemented in whole or in part by software, hardware and combinations thereof. The above-mentioned modules may be embedded in a processor in the form of hardware or independent of a processor in a computer, or may be stored in a memory of a computer in the form of software, so that a processor may invoke and execute the operations corresponding to the above-mentioned modules.

Figure 13:
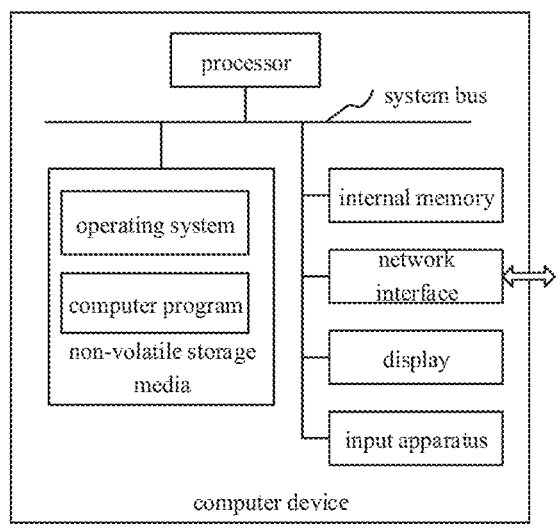
FIG. 13 is a schematic diagram of an internal structure of a computer device provided according to an embodiment of the present disclosure.

In one embodiment, a computer device is provided. The computer device may be a server, and its internal structure diagram may be as shown in FIG. 13. The computer device includes a processor, a memory, a network interface and a database connected through a system bus. The processor of the computer device is used to provide calculation and control capabilities. The memory of the computer device includes a non-volatile storage medium and an internal memory. The non-volatile storage medium stores an operating system, a computer program, and a database. The internal memory provides an environment for the operation of the operating system and the computer program in the non-volatile storage medium. The database in the computer device is used to store video data and other data. The network interface of the computer device is used to communicate with an external terminal through a network connection. The computer program is executed by the processor to realize a method for controlling video playback speed.

Those skilled in the art may understand that the structure shown in FIG. 13 is only a block diagram of a part of the structure related to the solution of the present disclosure, and does not constitute a limitation on the computer device to which the solution of the present disclosure is applied. The specific computer device may include more or fewer parts than shown in the figure, or combine some parts, or have a different arrangement of parts.

In one embodiment, a computer device is provided, where the computer device includes a memory and a processor, the memory stores a computer program, and the processor, when executing the computer program, implements the following steps:

receiving a speed adjustment instruction;

determining, according to correspondence relationship between the speed adjustment instruction and time length, a first time length corresponding to the speed adjustment instruction;

obtaining first video data through an image acquisition apparatus according to the first time length; and compositing the first video data and second video data according to a second time length to obtain third video data, where the second time length is playback time length for the third video data, and a playback screen for the third video data includes a playback screen for the first video data and a playback screen for the second video data.

The foregoing embodiment provides a computer device, and its implementation principle and technical effect are similar to those of the foregoing method embodiments, which are not redundant herein.

In one embodiment, a computer readable storage medium is provided, which stores a computer program that implements, when executed by a processor, the following steps:

receiving a speed adjustment instruction;

determining, according to correspondence relationship between the speed adjustment instruction and time length, a first time length corresponding to the speed adjustment instruction;

obtaining first video data through an image acquisition apparatus according to the first time length; and compositing the first video data and second video data according to a second time length to obtain third video data, where the second time length is playback time length for the third video data, and a playback screen for the third video data includes a playback screen for the first video data and a playback screen for the second video data.

The foregoing embodiment provides a computer readable storage medium, and its implementation principle and technical effect are similar to those of the foregoing method embodiments, which are not redundant herein.

Those skilled in the art may understand that all or part of the processes in the above-mentioned embodiment methods may be implemented by instructing relevant hardware through a computer program. The computer program may be stored in a non-volatile computer readable storage. In the medium, when the computer program is executed, it may include the procedures of the above-mentioned method embodiments. Any reference to memory, storage, database or other media used in the various embodiments provided in the present disclosure may include non-volatile and/or volatile memory. The non-volatile memory may include read-only memory (ROM), programmable ROM (PROM), electrically programmable ROM (EPROM), electrically erasable programmable ROM (EEPROM), or flash memory. The volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRS-DRAM), enhanced SDRAM (ESDRAM), synchronous link (Synchlink) DRAM (SLDRAM), memory bus (Rambus) direct RAM (RDRAM), direct memory bus dynamic RAM (DRDRAM), memory bus dynamic RAM (RDRAM), etc.

The technical features of the above embodiments may be combined arbitrarily. In order to make the description concise, all possible combinations of the technical features in the above embodiments are not described. However, as long as there is no contradiction in the combination of these technical features, they should be considered as the range described in this specification.

The above-mentioned embodiments only express several implementation manners of the present disclosure, and their description is relatively specific and detailed, but they should not be understood as a limitation to the scope of the present disclosure. It should be pointed out that for one of ordinary skill in the art, without departing from the concept of the present disclosure, several modifications and improvements may be made, and these all fall within the protection scope of the present disclosure. Therefore, the protection scope of the present disclosure should be subject to the appended claims.

What is claimed is:

1. A method for controlling video playback speed, comprising:
   receiving a speed adjustment instruction;
   determining, according to correspondence relationship between the speed adjustment instruction and time length, a first time length corresponding to the speed adjustment instruction;
   obtaining first video data through an image acquisition apparatus according to the first time length; and
   compositing the first video data and second video data according to a second time length to obtain third video data, wherein the second time length is a playback time length for the third video data, and a playback screen for the third video data comprises a playback screen for the first video data and a playback screen for the second video data.

2. The method of claim 1, wherein the compositing the first video data and the second video data according to the second time length to obtain the third video data comprises:
   comparing the first time length and the second time length to obtain a comparison result; and
   compositing the first video data and the second video data according to the comparison to obtain the third video data.

3. The method of claim 2, wherein the compositing the first video data and the second video data according to the comparison to obtain the third video data comprises:
   discarding a part of video data in the first video data according to a difference between the first time length and the second time length to obtain the fourth video data, in a case that the comparison result is that the first time length is greater than the second time length; and
   compositing the fourth video data and the second video data to obtain the third video data.

4. The method of claim 3, wherein the discarding a part of video data in the first video data comprises discarding one frame of adjacent frame images in the first video data.

5. The method of claim 2, wherein the compositing the first video data and the second video data according to the comparison to obtain the third video data comprises:
   adding a part of video data in the first video data into the first video data according to a difference between the first time length and the second time length to obtain a fifth video data, in a case that the comparison result is that the first time length is less than the second time length; and
   compositing the fifth video data and the second video data to obtain the third video data.

6. The method of claim 5, wherein the adding a part of video data in the first video data into the first video data comprises: copying a frame image of the first video data; and adding the copied frame image into respective frame images in the first video data.

7. The method of claim 1, wherein the faster the speed corresponding to the speed adjustment instruction is, the longer the first time length is; and the slower the speed corresponding to the speed adjustment instruction is, the shorter the first time length is.

8. The method of claim 1, further comprising:
   determining playback time for the second video data according to the first time length; and
   determining, according to the correspondence relationship between the first time length and a playback speed, the playback speed for the second video data during the playback time for the second video data.

9. The method of claim 8, wherein the longer the first time length is, the slower the playback speed for the second video is; and the shorter the first time length is, the faster the playback speed for the second video is.

10. The method of claim 8, wherein the determining, according to the correspondence relationship between the first time length and a playback speed, the playback speed for the second video data during the playback time for the second video data, comprises:
    dividing the first time length by a standard playback time length to obtain a quotient, wherein the standard playback time length is a time length during which the second video data is played at a common playback speed; and
    determining a playback speed for the second video data matching the quotient according to the quotient.

11. The method of claim 10, further comprising:
    determining, according to correspondence relationship between the standard playback time length and the second time length, the playback speed of the second video data in the playback screen of the third video data.

12. The method of claim 1, wherein the obtaining first video data through an image acquisition apparatus according to the first time length, comprises:
    receiving a plurality of initiation-control instructions and a plurality of corresponding termination-control instructions input successively by a user, wherein the initiation-control instruction is used to indicate a start time for recording each piece of video data, and the termination-control instruction is used to indicate an end time for terminating the recording each piece of video data:
    determining the third length of time for recording each piece of video data according to the start time and the end time; and
    obtaining the first video data according to the third time length and the first time length.

13. The method of claim 12, wherein the obtaining the first video data according to the third time length and the first time length, comprises:
    obtaining a plurality of pieces of video data corresponding to the third time length; and splicing the plurality of pieces of video data corresponding to the third time length to obtain the first video data.

14. An apparatus for controlling video playback speed, comprising:
- a receiving module, configured to receive a speed adjustment instruction;
- a determining module, configured to determine, according to correspondence relationship between the speed adjustment instruction and time length, a first time length corresponding to the speed adjustment instruction;
- an obtaining module, configured to obtain first video data through an image acquisition apparatus according to the first time length; and
- a compositing module, configured to composite the first video data and second video data according to a second time length to obtain third video data, wherein the second time length is playback time length for the third video data, and a playback screen for the third video data comprises a playback screen for the first video data and a playback screen for the second video data.

15. A computer device, comprising:
- a memory; and
- a processor,
- wherein the memory is configured to store a computer program, and when the computer program is executed by the processor, causes the processor to implement a method for controlling video playback speed, comprising:
- receiving a speed adjustment instruction;
- determining, according to correspondence relationship between the speed adjustment instruction and time length, a first time length corresponding to the speed adjustment instruction;
- obtaining first video data through an image acquisition apparatus according to the first time length; and
- compositing the first video data and second video data according to a second time length to obtain third video data, wherein the second time length is a playback time length for the third video data, and a playback screen for the third video data comprises a playback screen for the first video data and a playback screen for the second video data.

16. The computer device of claim 15, wherein the compositing the first video data and the second video data according to the second time length to obtain the third video data comprises:
- comparing the first time length and the second time length to obtain a comparison result; and
- compositing the first video data and the second video data according to the comparison to obtain the third video data.

17. The computer device of claim 16, wherein the compositing the first video data and the second video data according to the comparison to obtain the third video data comprises:
- discarding a part of video data in the first video data according to a difference between the first time length and the second time length to obtain the fourth video data, in a case that the comparison result is that the first time length is greater than the second time length; and
- compositing the fourth video data and the second video data to obtain the third video data.

18. The computer device of claim 17, wherein the discarding a part of video data in the first video data comprises discarding one frame of adjacent frame images in the first video data.

19. The computer device of claim 16 wherein the compositing the first video data and the second video data according to the comparison to obtain the third video data comprises:
- adding a part of video data in the first video data into the first video data according to a difference between the first time length and the second time length to obtain a fifth video data, in a case that the comparison result is that the first time length is less than the second time length; and
- compositing the fifth video data and the second video data to obtain the third video data.

20. A non-transitory computer readable storage medium, storing a computer program that implements, when executed by a processor, the method of claim 1.

* * * * *